United States Patent
Carpenter et al.

(10) Patent No.: US 10,555,019 B2
(45) Date of Patent: *Feb. 4, 2020

(54) SYSTEM AND METHOD FOR SMOOTH TRANSITION OF LIVE AND REPLAY PROGRAM GUIDE DISPLAYS

(71) Applicant: MobiTV, Inc., Emeryville, CA (US)

(72) Inventors: Cory Carpenter, Walnut Creek, CA (US); Iylla Dosenbach, Los Angeles, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,110

(22) Filed: Dec. 5, 2018

(65) Prior Publication Data
US 2019/0116393 A1   Apr. 18, 2019

Related U.S. Application Data

(63) Continuation of application No. 15/623,337, filed on Jun. 14, 2017, now Pat. No. 10,178,423.

(51) Int. Cl.
*H04N 21/262* (2011.01)
*H04N 21/472* (2011.01)
*H04N 21/482* (2011.01)

(52) U.S. Cl.
CPC . *H04N 21/26283* (2013.01); *H04N 21/47202* (2013.01); *H04N 21/4821* (2013.01)

(58) Field of Classification Search
CPC ......... H04N 21/26283; H04N 21/4821; H04N 21/47202
See application file for complete search history.

(56) References Cited

U.S. PATENT DOCUMENTS

| 2003/0115606 | A1  | 6/2003 | Menez |
| 2003/0177495 | A1* | 9/2003 | Needham ............. H04N 21/482 725/39 |
| 2010/0192182 | A1* | 7/2010 | Baldwin ............ H04N 21/4821 725/45 |

OTHER PUBLICATIONS

"U.S. Appl. No. 15/623,337, Advisory Action dated Aug. 14, 2018", 2 pages.
"U.S. Appl. No. 15/623,337, Final Office Action dated May 4, 2018", 12 pages.

* cited by examiner

*Primary Examiner* — Hai V Tran
(74) *Attorney, Agent, or Firm* — Kwan & Olynick LLP

(57) ABSTRACT

In general, certain embodiments of the present disclosure provide methods and/or systems for implementing a program guide, which comprises sending a first request and receiving a first response associated with a current or future program guide information. The current or future program guide information includes a first plurality of channel identifiers and a plurality of time slots that correspond to current or future time slots, and is displayed at a client device. A second request is sent, which indicates a requested time period that has already occurred and not displayed on the client device, and corresponds to navigation to a previous time slot. A second response is received, which is associated with past program guide information. The past program guide information includes a second plurality of channel identifiers and on-demand program information, and is displayed at the client device.

20 Claims, 9 Drawing Sheets

| Date 301 | | Time 311 | Time 313 | Time 315 |
|---|---|---|---|---|
| Channel 321 | Icon 331 | Program 341 | | Program 343 |
| Channel 323 | Icon 333 | Program 345 | Program 347 | |
| Channel 325 | Icon 335 | Program 351 | | |
| Channel 327 | Icon 371 | Program 353 | Program 355 | Program 357 |
| Channel 329 | --- | --- | | |
| Channel 381 | --- | --- | | |

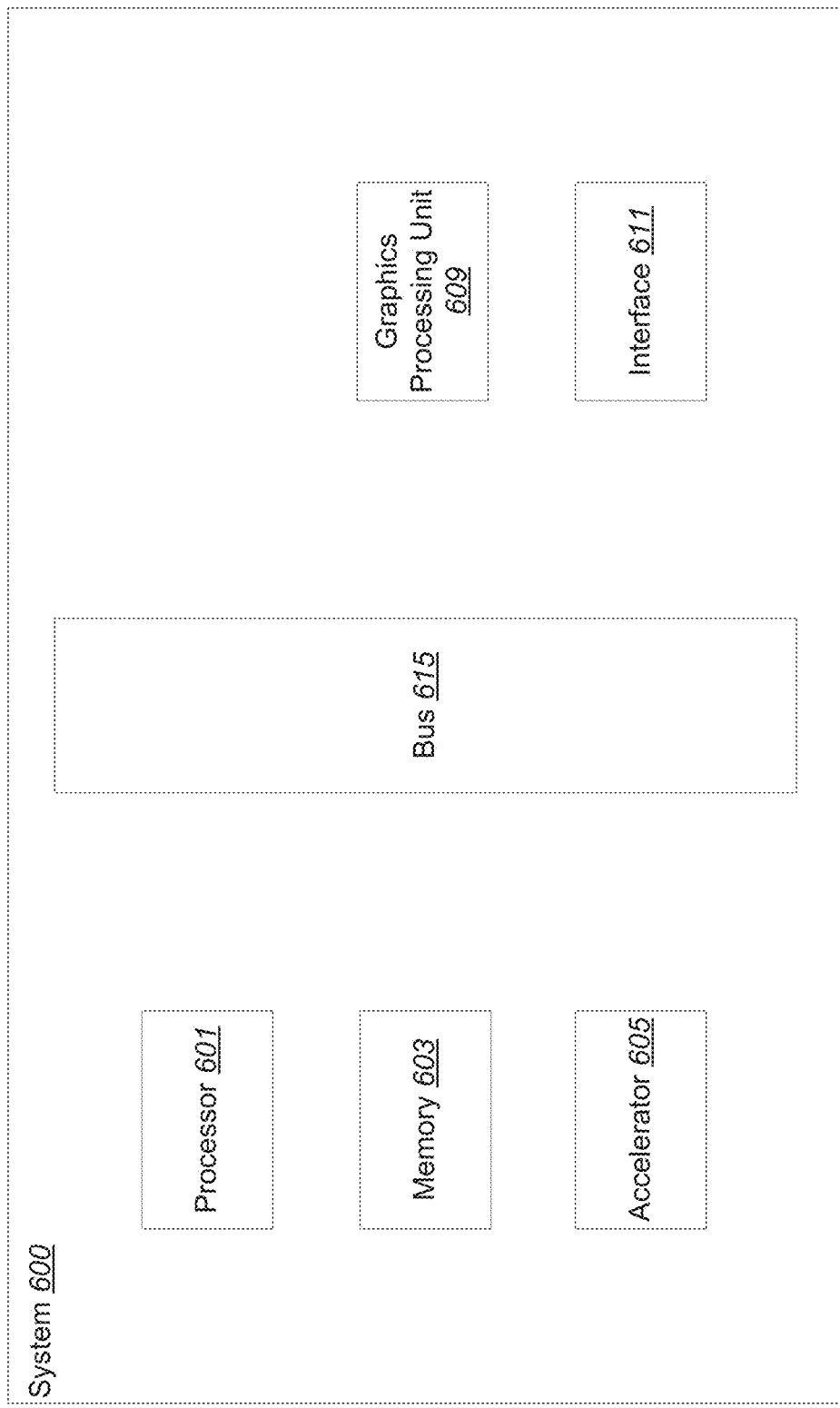

SYSTEM AND METHOD FOR SMOOTH TRANSITION OF LIVE AND REPLAY PROGRAM GUIDE DISPLAYS

CROSS-REFERENCE TO RELATED APPLICATIONS

This application is a continuation of and claims priority to U.S. patent application Ser. No. 15/623,337, entitled, "SYSTEM AND METHOD FOR SMOOTH TRANSITION OF LIVE AND REPLAY PROGRAM GUIDE DISPLAYS", filed on Jun. 14, 2017, by Cory Carpenter which is hereby incorporated by reference in its entirety and for all purposes.

TECHNICAL FIELD

The present disclosure relates to program guides on client devices. In one example, the present invention relates to methods and apparatus for allowing client devices to dynamically and efficiently access on-demand program guide information.

DESCRIPTION OF RELATED ART

Some client devices such as cellular phones have the capability of playing broadcast media streams, such as broadcast video or audio streams. A client device user can select a particular channel and receive broadcast media for a selected station. In order to provide a user with a more complete user experience, program guide information including channel, title, and time information can be provided. In some instances, the program guide information is downloaded to a client device from a service provider.

However, mechanisms for providing program guide information to client devices are limited. In many instances, providing program guide information to a client device disrupts a user's experience. Consequently, the techniques of the present invention provide mechanisms for improving the ability of client devices to obtain program guide information.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for transitioning between program guides displaying current and on-demand programs. According to various embodiments, a method for implementing a program guide is provided. The method comprises sending a first request from a client device to a server. The first request may be associated with current or future program guide information. A first response is received at the client device from the server. The first response may be associated with the current or future program guide information. The current or future program guide information may include a first plurality of channel identifiers and a plurality of time slots. The plurality of time slots may correspond to current or future time slots.

The method further comprises displaying at the client device, the current or future program guide information, which includes the first plurality of channel identifiers and the plurality of time slots. The channel identifiers may be listed vertically, while the time slots may be displayed horizontally.

The method further comprises sending a second request from the client device to the server. The second request may be associated with past program guide information. The second request may indicate a requested time period that has already occurred and not displayed on the client device. Furthermore, second request may correspond to navigation to a previous time slot. A second response is received at the client device from the server. The second response may be associated with the past program guide information. The past program guide information may include a second plurality of channel identifiers and on-demand program information.

The method further comprises displaying at the client device, the past program guide information including the second plurality of channel identifiers and the on-demand program information. The past program guide information may only display on-demand program information and does not display program information corresponding to non-playable program content. The on-demand program information may be displayed chronologically in rows corresponding to the second plurality of channel identifiers. Here, the channel identifiers may also be listed vertically. Horizontal navigation through the on-demand program information in one row may only affects the items in that particular row.

The transition from current or future program guide information to the past program guide information may occur seamlessly without a user having to open another application.

Other implementations of this disclosure include corresponding systems and computer programs configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features. In another aspect, which may include at least a portion of the subject matter of any of the preceding and/or following examples and aspects, a system for image sequence stabilization comprises a processor and memory storing one or more programs configured for execution by the processor. The one or more programs comprise instructions for performing the actions of described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 6 illustrates an example of a program guide implementation system, in accordance with one or more embodiments.

DESCRIPTION OF PARTICULAR EMBODIMENTS

Figure 1:
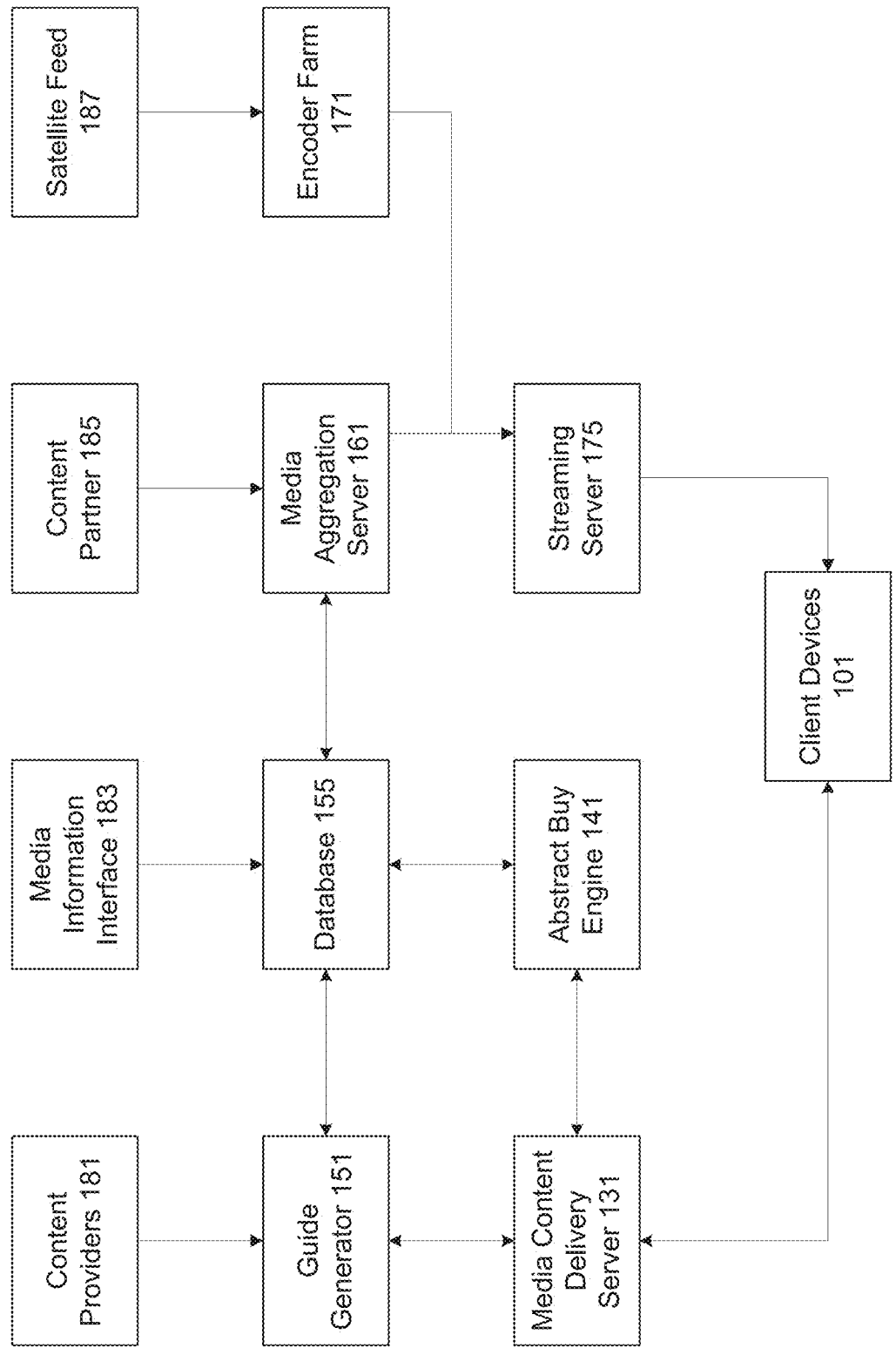
FIG. 1 is a diagrammatic representation showing a network that can use the techniques and mechanisms of the present invention, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular file formats. However, it should be noted that the techniques of the present disclosure apply to various other file formats. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a method for implementing a program guide is provided which enables a client device to dynamically and efficiently access on-demand program guide information. A request is sent from a client device, such as a mobile phone or television, to view current or future programming information. Current or future programming information may include information on programs currently playing on various channels and/or programs scheduled to be played on various channels. A response may then be received at the client device which causes a first program guide to be displayed at the client device which lists current and/or future programs for corresponding channels at a given time slot. In some embodiments, channel identifiers corresponding to the various channels may be listed vertically, while the corresponding programs may be displayed horizontally in corresponding time slots.

For example, the user of the client device may browse through current or future programs by starting at the current program of a particular channel and scroll right toward future programs. As used herein, the term "scroll" shall refer to directional movement, either right, left, up, down or a combination thereof, of a user's selection within a given program guide. As a program is selected, information corresponding to the program may be displayed, such as year of production, length of program, etc.

In some, past programs may not be concurrently shown with the current or future programs. However, a user may access programming information corresponding to past programs by scrolling left past the current program and/or time slot. Such input may send a request to view past programming information. A response may then be received at the client device which causes a second program guide to be displayed at the client device which lists past programs for corresponding channels. Like the first program guide, the channel identifiers may be listed vertically, and past programs available for on-demand viewing may be arranged horizontally in the rows corresponding to the channels. In some embodiments, the past programs may be listed in chronological order, with the earliest programs toward the left.

In various embodiments, this allows the paradigm wherein channels are listed vertically and programs are listed in chronological order to be preserved, thus preserving the display format between the two program guides. This provides a seamless transition between past program guide information and current or future program guide information.

Although the past programming information may be presented in chronological order, in some embodiments, the past programming may not be associated with time slots as in the first program guide. Thus, programs not available for on-demand viewing may be removed without showing gaps or empty spaces when presenting past programming information. In some embodiments, first and second program guides may be displayed concurrently. In further embodiments, the second program guide may present past programming information in other arrangements, such as by alphabetical order or user rating.

Example Embodiments

FIG. 1 is a diagrammatic representation showing one example of a network that can use the techniques of the present invention. According to various embodiments, media content is provided from a number of different sources, or content partners 185. Media content may be provided from content partners 185, such as film libraries, cable companies, movie and television studios, commercial and business users, etc. and maintained at a media aggregation server 161. Any mechanism for obtaining media content from a large number of sources in order to provide the media content to client devices in live broadcast streams is referred to herein as a media content aggregation server.

The media content aggregation server 161 may be clusters of servers located in different data centers. According to various embodiments, content provided to a media aggregation server 161 is provided in a variety of different encoding formats with numerous video and audio codecs. Media content may also be provided via satellite feed 187.

An encoder farm 171 is associated with the satellite feed 187 and can also be associated with media aggregation server 161. The encoder farm 171 can be used to process media content from satellite feed 187 as well as possibly from media aggregation server 161 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi-Narrow Band (AMR-NB), Advanced Audio coding (AAC), and AACPlus. The media content may also be encoded to support a variety of data rates. The media content from media aggregation server 161 and encoder farm 171 is provided as live media to a streaming server 175. In one example, the streaming server is a Real Time Streaming Protocol (RTSP) server 175. Media streams are broadcast live from an RTSP server 175 to individual client devices 101. A variety of protocols can be used to send data to client devices.

Possible client devices 101 include personal digital assistants (PDAs), cellular phones, personal computing devices, etc. In various embodiments, client devices 101 may also refer to any device that may be implemented to view entertainment and/or news programming, such as televisions, gaming systems, mobile phones, tablets, virtual reality/augmented reality headsets, etc. According to various embodiments, the client devices are connected to a cellular network run by a cellular service provider. Cell towers typically provide service in different areas. Alternatively, the client device can be connected to a wireless local area network (WLAN) or some other wireless network. Live media streams provided over RTSP are carried and/or encapsulated on one of a variety of wireless and/or wired networks.

The client devices may also be connected over a wireless network to a media content delivery server 131. The media content delivery server 131 is configured to allow a client device 101 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 151. The guide generator 151 obtains information from disparate sources including content providers 181 and media information sources 183. The guide generator 151 provides program guides to database 155 as well as to media content delivery server 131 to provide to client devices 101. The media content delivery server 131 is also associated with an abstract buy engine 141. The abstract buy engine 141 maintains subscription information associated with various client devices 101. For example, the abstract buy engine 141 tracks purchases of premium packages.

The media content delivery server 131 and the client devices 101 communicate using requests and responses. For example, the client device 101 can send a request to media content delivery server 131 for a subscription to premium content. According to various embodiments, the abstract buy engine 141 tracks the subscription request and the media content delivery server 131 provides a key to the client 101 to allow it to decode live streamed media content. According to various embodiments, all client devices 101 have access to media content broadcast over the airwaves. However, only client devices 101 authorized by a media content delivery server 131 can actually display certain media content. Similarly, the client device 101 can send a request to a media content delivery server 131 for a program guide for its particular program package. The media content delivery server 131 obtains the guide data from the guide generator 151 and associated database 155 and provides appropriate guide information to the client device 101.

Although the various devices such as the guide generator 151, database 155, media aggregation server 161, etc. are shown as separate entities, it should be appreciated that various devices may be incorporated onto a single server. Alternatively, each device may be embodied in multiple servers or clusters of servers. According to various embodiments, the guide generator 151, database 155, media aggregation server 161, encoder farm 171, media content delivery server 131, abstract buy engine 141, and streaming server 175 are included in an entity referred to herein as a media content delivery system.

Figure 2:
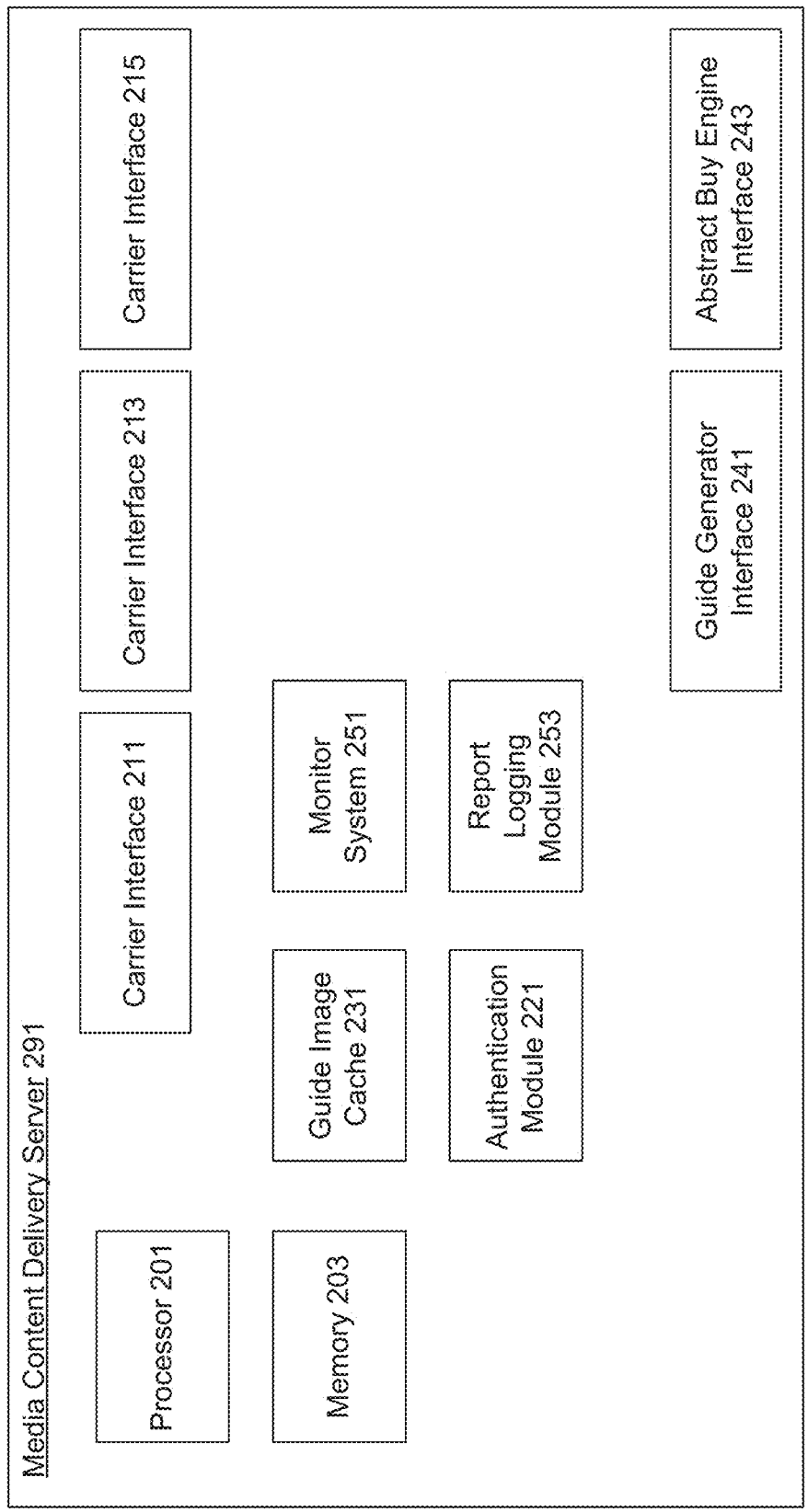
FIG. 2 is a diagrammatic representation depicting a content delivery system, in accordance with one or more embodiments.

FIG. 2 is a diagrammatic representation showing one example of a media content delivery server 291. In some embodiments, media content delivery server 291 may be media content delivery server 131, as described with reference to FIG. 1. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. The media content delivery server 291 can also maintain static information such as icons and menu pages. The interfaces also include a carrier interface 211 allowing operation with client devices such as cellular phones operating in a particular cellular network. The carrier interface allows a carrier vending system to update subscriptions. Carrier interfaces 213 and 215 allow operation with client devices operating in other wireless networks. An abstract buy engine interface 243 provides communication with an abstract buy engine that maintains subscription information.

An authentication module 221 verifies the identity of client devices. A logging and report generation module 253 tracks client device requests and associated responses. A monitor system 251 allows an administrator to view usage patterns and system availability. According to various embodiments, the media content delivery server 291 handles requests and responses for media content related transactions while a separate streaming server provides the actual media streams. Media streams are broadcast to client devices, but client devices are not configured to access and a user is not able to view media content unless appropriate authorizations are made through a media content delivery server 291. In some instances, a media content delivery server 291 may also have access to a streaming server or operate as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

Figure 3:
FIG. 3 is a diagrammatic representation showing a block of a program guide, in accordance with one or more embodiments.

FIG. 3 is a diagrammatic representation showing a block of a program guide 300, in accordance with one or more embodiments. In some embodiments, program guide 300 may correspond to current or future programs. In one example, program guide structure such as a listing of channels or at least a partial listing of channels is initially downloaded to allow a user to begin navigating. The block of program guide content information is associated with date 301 and times 311, 313, and 315. In another example, the times 311, 313, and 315 cover a time range from time 311 through time 315, such as 3 pm to 5 pm. Programs 341, 343, 345, 347, 351, 353, 355, and 357 are included in the program guide information block. As depicted, the programs in program guide block 300 are arranged chronologically in accordance with times 311, 313, and 315. As such, the length of the boxes corresponding to a particular program may be sized based on the length of the program, as shown in FIG. 3. In various embodiments, time 311 may correspond to the current or future time. However, in some embodiments, time 311 may correspond to a past time.

In particular examples, icons 331, 333, 335, and 371 are provided. The program guide information block shows program guide information for channels 321, 323, 325, 327, 329, and 381. In some examples, a program guide includes information for hundreds of channels. A program guide can be created by a guide generator from information provided by a variety of content providers. Program guide structure information can be unique to each user. Program guide content information is maintained in relatively generic form and can be cached on a server.

Available systems download program guide information for all available channels or substantially all subscribed channels. In many instances, an entire program guide is downloaded. Downloading an entire program guide can take a long period of time, use considerable bandwidth, and consume resources on a device. For client devices with media capabilities operating in wireless networks, it is contemplated that it is beneficial to download program guide structure to allow a user to begin navigating while downloading program guide content dynamically based on demand from a user. In some examples, program guide content is downloaded in blocks.

In various embodiments, program guide content block size may be determined based on the size of available client device memory. In another alternative, a program guide information block size is based upon data transmission rates, server cache block sizes, or available bandwidth. A wide variety of criteria and combinations of criteria can be used in determining a program guide information block size. In other examples, just enough data is downloaded to display a list and allow a user to begin to navigate the program guide information. As the user views different parts of the guide, the detailed content of the guide is downloaded separately and displayed as needed. There is no need to download the entire guide. Only what the user needs to view is downloaded on demand. Potentially limitless guide data can be downloaded in this manner. Even weeks or months of data can be obtained. The user gets immediate feedback and does not need to wait for the data. The guide is not limited to the memory storage on the device or the service bandwidth. Guide data can be constantly updated since only the visible portion needs to be downloaded.

In some examples program guide content information only provides information for channels 321, 323, 325, and 327 and not for hundreds or thousands of other channels. A client device screen may only be sufficient to display a portion of the program guide information block. For example, the client device screen may only show information for channels 321, 323, and 325. Nonetheless, some extra information may be downloaded in anticipation of a user requesting that information. Although the channels shown are contiguous, it should be noted that channels and times as well do not have to be contiguous.

Figure 4:
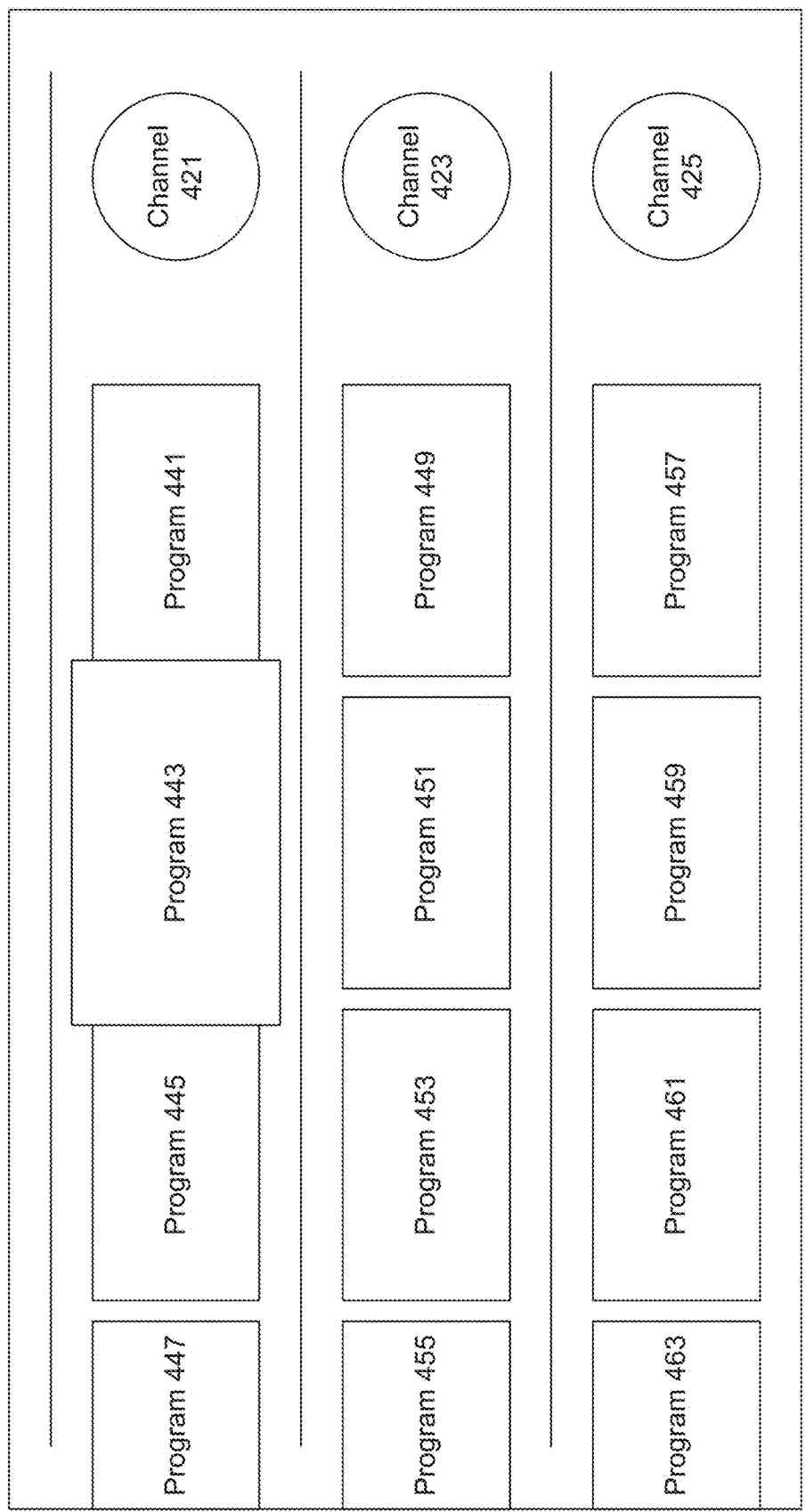
FIG. 4 is a diagrammatic representation showing a block of an on-demand program guide, in accordance with one or more embodiments.
Figure 5A:
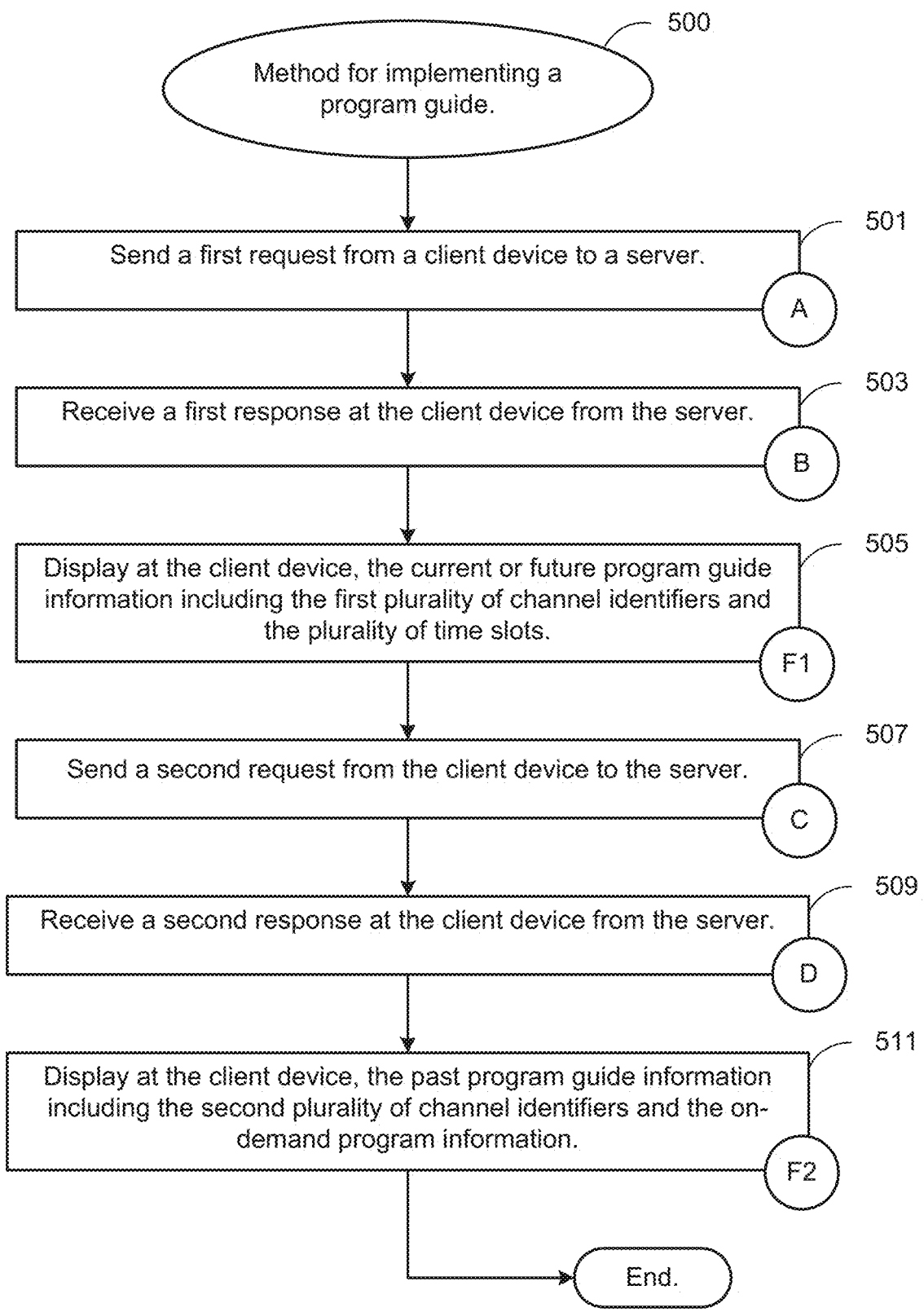
FIGS. 5A, 5B, 5C, and 5D illustrate an example method for implementing a program guide, in accordance with one or more embodiments.
Figure 5B:
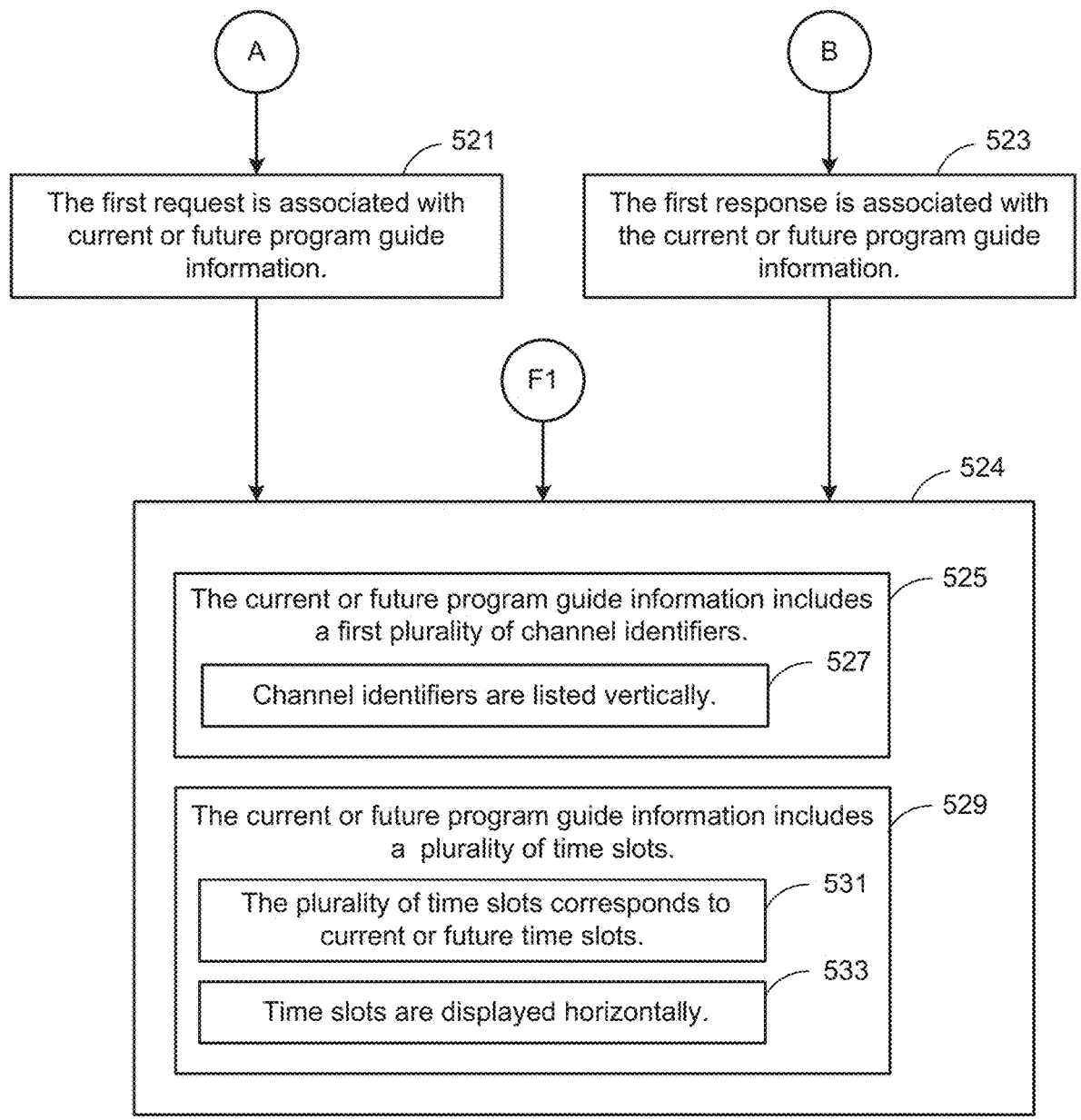
Figure 5C:
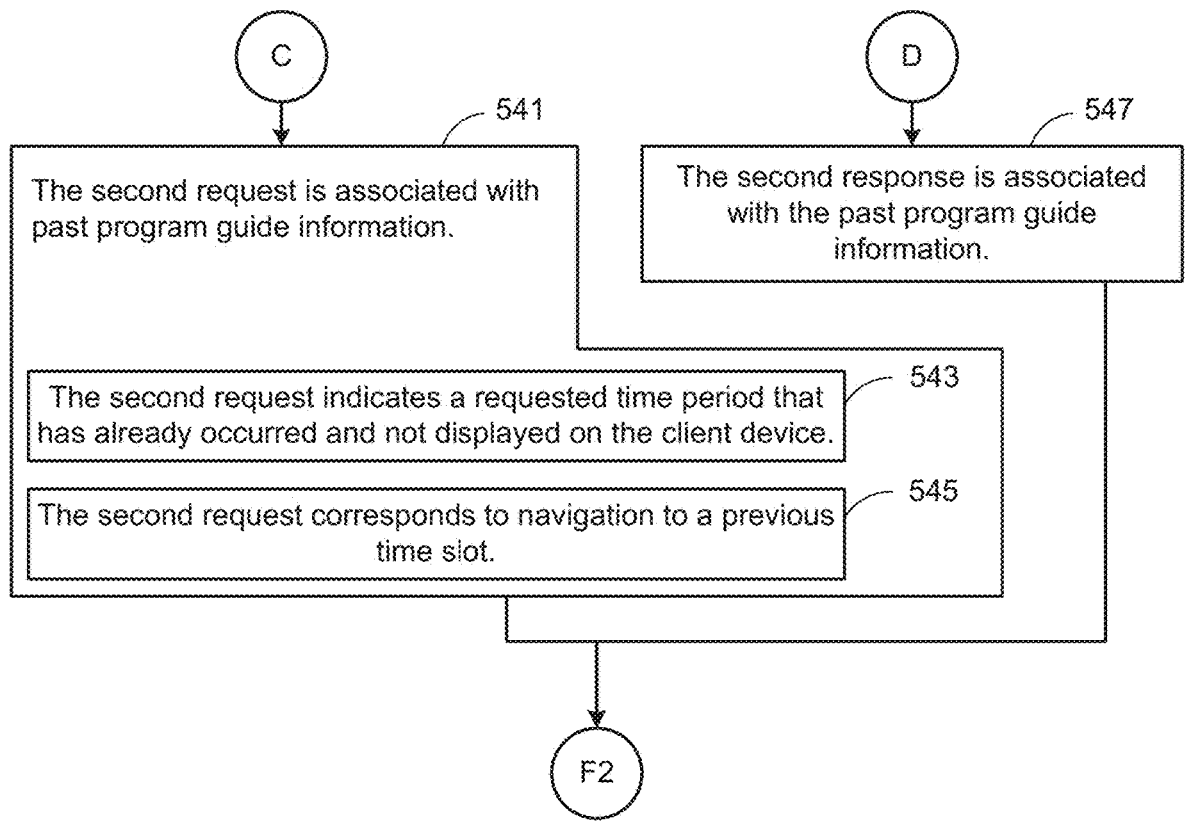
Figure 5D:
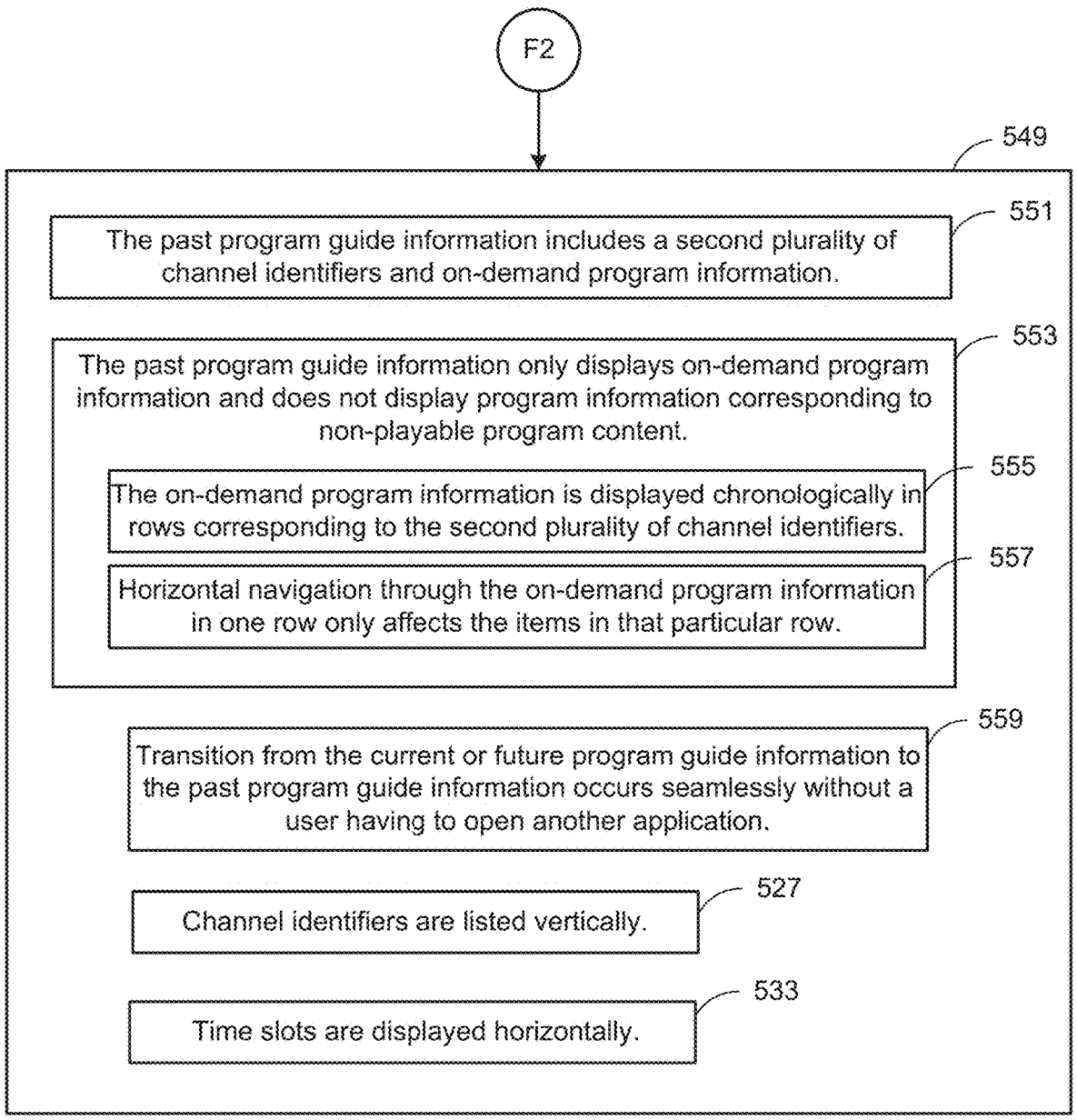

FIG. 4 is a diagrammatic representation showing a block of an on-demand program guide 400, in accordance with one or more embodiments. In one example, program guide structure such as a listing of channels or at least a partial listing of channels is initially downloaded to allow a user to begin navigating. The block of on-demand program guide content information is associated with channels 421, 423, and 425. In some embodiments, icons corresponding to the channels may be displayed along with the channel numbers. In some embodiments, channels 421, 423, and 425 may correspond to channels 321, 323, and 325, respectively. In some embodiments, on-demand program guide 400 may include more channels that may be accessed by a user through input, such as by scrolling downwards and/or upwards on the program guide 400. In some examples, a program guide includes information for hundreds of channels. A program guide can be created by a guide generator from information provided by a variety of content providers. Program guide structure information can be unique to each user. Program guide content information is maintained in relatively generic form and can be cached on a server.

Programs 441, 443, 445, 447, 449, 451, 453, 455, 457, 459, 461, and 463 are included in the on-demand program guide information block. As shown, programs 441, 443, 445, and 447 correspond to channel 421; programs 449, 451, 453, and 455 correspond to channel 423; and programs 457, 459, 461, and 463 correspond to channel 425. In some embodiments, each channel and its corresponding programs are displayed as boxes in a horizontal row. A user may be able to access more programs associated with a particular channel by scrolling left and/or right along the corresponding row.

As shown, program 443 is enlarged. In some embodiments, a program selected or highlighted by a user may be displayed as an enlarge box relative to the other displayed boxes. Programs displayed in on-demand program guide block 400 may correspond to previously aired and/or time-shifted programs that are available for replay at a later desired time.

In some embodiments, the programs displayed in on-demand program guide block 400 may be arranged in a chronological order. However, in contrast to program guide block 300, the boxes corresponding to a program may not be sized to correspond to the length of the program, or correspond to particular times, in various embodiments. In some embodiments, programs 441-463 may alternatively be arranged in alphabetical order per row. In some embodiments, programs 44-463 may be arranged based on user interest or user selection. Various other factors may be used to order and/or arrange the programs and/or channels.

In some embodiments, the modified presentation of program guide 400 may not be a grid in a strict sense because the horizontal access is removed; however, the paradigm wherein channels are listed vertically and programs are listed in chronological order is preserved. The behavior of the new presentation is such that, as the user scrolls horizontally, only the list items in that row scroll.

In some embodiments, programs that have already aired that don't have rights to be played are removed and not displayed. Thus, available programs are displayed without leaving large visual gaps in the viewport while maintaining the mental model of the user in that programs a horizontally listed by channel in a chronological order.

As previously described with reference to FIG. 3, available systems download program guide information for all available channels or substantially all subscribed channels. In many instances, an entire program guide is downloaded. In some embodiments, the program guide structure is downloaded first to allow a user to begin navigating while downloading program guide content dynamically based on demand from a user. In some examples, program guide content is downloaded in blocks. A wide variety of criteria and combinations of criteria can be used in determining a program guide information block size.

In some embodiments, a combination of program guides 300 and 400 may be presented in a single program guide display. Program guides 300 and 400 may be displayed such that the channels rows of one correspond to the other. As such, a user may simultaneously view current and future programs, as well as past programs available for replay, for each channel. This would allow seamless scrolling through past, current, and future programs for each channel.

In some examples, of both program guides 300 and 400, a media content delivery server may remember channels or groups of channels frequently accessed by a user and provide the channels or groups of channels as part of a block of program guide information. In another example, a media content delivery server can recognize that users often scrolls down on a program guide and provide several pages of scroll down program guide information to a user preemptively even before the user performs any scrolling.

In still other examples, a media content delivery server can recognize user viewing or listening patterns and download blocks of program guide content information believed to be of interest to a user. Similarly, a media content delivery server can determine times when media is frequently accessed and provide blocks of program guide information based on viewing times. In some embodiments, user selection and/or scrolling patterns may be recognized to download blocks of program guide content information believed to be of interest to a user. A wide variety of algorithms can be implemented to intelligently select portions of program guide content information for download to a client device without having to download the entire program guide. Resources can be conserved while still providing the user with an active and dynamic experience.

FIG. 5 illustrates an example method 500 for implementing a program guide, in accordance with one or more embodiments. In various embodiments, method 500 may be used to implement a program guide as described with reference to FIGS. 3 and/or 4. At operation 501, a first request 521 is sent from a client device to a server. In some embodiments, the first request 521 is associated with current or future program guide information 524. At operation 503 a first response 523 is received at the client device from the server. In some embodiments, the first response 523 is associated with the current or future program guide information 524. In various embodiments, the current or future program guide information 524 includes a first plurality of channel identifiers 525 and a plurality of time slots 529.

At operation 505, the current or future program guide information 524 is displayed at the client device. In various embodiments, the current or future program guide information 524 may be displayed as a block of a program guide, such as program guide 300, as depicted in FIG. 3. The displayed current or future program guide information includes the first plurality of channel identifiers 525 and the plurality of time slots 529. The channel identifiers 525 may be listed (527) vertically. The plurality of time slots 529 may correspond to current or future time slots 531 and may be displayed (533) horizontally. However, in other embodiments, channel identifiers 525 may be listed horizontally with the plurality of time slots 531 displayed vertically.

At operation 507, a second request 541 is sent from the client device to the server. In some embodiments, the second request 541 is associated with past program guide information 549. In some embodiments, the second request 541 indicates a requested time period 543 that has already occurred and not displayed on the client device. For example, the second request 541 corresponds to navigation to a previous time slot 545. In some examples, operation 507 may be triggered by user input, such as scrolling toward the left past the current time on program guide 300.

Existing program guides do not permit a user to scroll to programs that occurred before the current time. Generally, a user must open a separate application in order to send a request to access saved and/or on-demand programs. The systems and methods described herein provide a seamless transition to time shifted programs that are available for replay.

At operation 509 a second response 547 is received at the client device from the server. In some embodiments, the second response 547 is associated with the past program guide information 549. In various embodiments, the past program guide information 549 includes a second plurality of channel identifiers 551 and on-demand program information 553. In various embodiments, on-demand program information 553 may include various available media content, media streams, program information, etc.

At operation 511, the past program guide information 549 is displayed at the client device. In various embodiments, the past program guide information 549 may be displayed as a block of a program guide, such as on-demand program guide 400, as depicted in FIG. 4.

The displayed past program guide information 549 includes the second plurality of channel identifiers 551 and the on-demand program information 553. In some embodiments, the past program guide information 549 only displays on-demand program information 553 and does not display program information corresponding to non-playable program content. The on-demand program information may be displayed (555) chronologically in rows corresponding to the second plurality of channel identifiers 551. As with the current or future program guide information 524, in some embodiments, the second plurality of channel identifiers 551 are listed (527) vertically, and timeslots are displayed (533)

horizontally. Thus, the display format between the two program guides is preserved. In some embodiments, horizontal navigation 557 through the on-demand program information 553 in one row only affects the items in that particular row.

In some embodiments, the user may select to return to program guide 300. In the present example, the user may scroll right past the most recent program for a particular channel in program guide 400. This may cause the first request to be resent to the server for current or future program guide information 524, as previously described with reference to operation 501.

In some embodiments, transition 559 between the current or future program guide information 524 to the past program guide information 549 occurs seamlessly without a user having to open another application. Thus, a user can transition from the traditional grid of live/upcoming programs (i.e., program guide 300) to a modified presentation of previously aired programs (i.e., program guide 400) by moving left from the first time column of the traditional grid (program guide 300).

As previously described, a media content delivery server may recognize user viewing or listening patterns and predict which program guide content information to download that may be of interest to a user. For example, a media content delivery server may recognize that a user often requests past program guide information 549 as a user scrolls left toward the current program time slot for a particular channel. The server may begin download of past programming information for that particular channel and/or other channels as the user is scrolling toward the left before the user reaches the current time slot.

In other examples, once the user has requested past program guide information 549, the current or future program guide information 524 may be temporarily stored in a cache for a predetermined amount of time. This may allow for a quicker display of the current or future program guide information 524 when the user decides to return to program guide 300. In some embodiments, program information corresponding to a predetermined number of time slots may be stored in the cache for retrieval, such as five half hour slots (corresponding to the upcoming two and a half hours of programming). In some embodiments, as time passes, additional time slots may be automatically downloaded and stored in the cache. For example, once the current time has reached the end of a half hour time slot, the time slot that is now five slots away may be automatically downloaded.

Similarly, past program guide information 549 may also be temporarily stored in a cache for a predetermined amount of time, once it has been accessed by the user such that display of past program guide information 549 may be subsequently accessed more quickly. In some embodiments, a predetermined number of past programs may be stored in the cache for retrieval. For example, as current programs finish airing, information corresponding to those programs may be stored as past programming information 549 in the cache and the earliest programs may be removed from the cache.

Various computing devices can implement the methods described. For instance, a client device, computer system, etc. can be used to generate program guides. With reference to FIG. 6, shown is a particular example of a computer system that can be used to implement particular examples of the present disclosure. For instance, the computer system 600 can be used to generate program guides according to various embodiments described above. In addition, the computer system 600 shown can represent a computing system on a client device.

According to particular embodiments, a system 600, suitable for implementing particular embodiments of the present disclosure, includes a processor 601, a memory 603, accelerator 605, image editing module 609, an interface 611, and a bus 615 (e.g., a PCI bus or other interconnection fabric) and operates as a streaming server. In some embodiments, when acting under the control of appropriate software or firmware, the processor 601 is responsible for various processes, including processing inputs through various computational layers and algorithms, as described herein. Various specially configured devices can also be used in place of a processor 601 or in addition to processor 601. The interface 611 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions for operations including sending and/or receiving programming information and/or content, or requests for such programming information, as well as display and operation of program guides. The program instructions may control the operation of an operating system and/or one or more applications, for example. The memory or memories may also be configured to store received metadata and batch requested metadata.

In some embodiments, system 600 further comprises a graphics processing unit (GPU) 609. As described above, the GPU 609 may be implemented to transition between displays of program guides, such as program guides 300 and 400. In some embodiments, system 600 further comprises an accelerator 605. In various embodiments, accelerator 605 is a rendering accelerator chip, which may be separate from the graphics processing unit. Accelerator 605 may be configured to speed up the processing for the overall system 600 by processing pixels in parallel to prevent overloading of the system 600. For example, in certain instances, ultra-high-definition images may be processed, which include many pixels, such as DCI 4K or UHD-1 resolution. In such instances, excess pixels may be more than can be processed on a standard GPU processor, such as GPU 609. In some embodiments, accelerator 605 may only be utilized when high system loads are anticipated or detected.

In some embodiments, accelerator 605 may be a hardware accelerator in a separate unit from the CPU, such as processor 601. Accelerator 605 may enable automatic parallelization capabilities in order to utilize multiple processors simultaneously in a shared memory multiprocessor machine. The core of accelerator 605 architecture may be a hybrid design employing fixed-function units where the operations are very well defined and programmable units where flexibility is needed. In various embodiments, accelerator 605 may be configured to accommodate higher performance and extensions in APIs, particularly OpenGL 2 and DX9. In some embodiments, accelerator 605 may be implemented to receive a function call corresponding to the first request 521 and/or second request 541 to transition between displays of different program guides, such as program guides 300 and 400. In some examples, accelerator 605 may manage the specialized program guide buffers located in memory 603 which store program guide information from various program guides to allow streamlined display of the program guides.

According to various embodiments, the system 600 is a server that also includes a transceiver, streaming buffers, and memory. The server may also be associated with configuration management, logging and report generation, and monitoring capabilities. In particular embodiments, functionality for allowing operation with client devices such as cellular phones operating in a particular cellular network and providing subscription management. According to various embodiments, an authentication module verifies the identity of devices including client devices. A logging and report generation module tracks client device requests and associated responses. A monitor system allows an administrator to view usage patterns and system availability. According to various embodiments, the fragment server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. A variety of configurations are possible.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

The invention claimed is:

1. A method for implementing a program guide, comprising:
sending a first request from a client device to a server, the first request associated with current or future program guide information;
receiving a first response at the client device from the server, the first response associated with the current or future program guide information, the current or future program guide information including a first plurality of channel identifiers and a plurality of time slots, the plurality of time slots corresponding to current or future time slots;
displaying at the client device in a viewport, the current or future program guide information including the first plurality of channel identifiers and the plurality of time slots, wherein blocks corresponding to current or future programs are sized according to the length of the program;
sending a second request from the client device to the server, the second request associated with past program guide information, wherein the second request indicates a requested time period that has already occurred and not displayed on the client device, the second request corresponding to navigation to a previous time slot;
receiving a second response at the client device from the server, the second response associated with the past program guide information, wherein the past program guide information includes a second plurality of channel identifiers; and
displaying at the client device in the viewport, the past program guide information including the second plurality of channel identifiers, past program information, and on-demand program information, wherein the second plurality of channel identifiers are listed vertically and blocks corresponding to past programs are not sized according to the length of the past programs and the blocks corresponding to the past programs are listed chronologically such that a single display format that provides a seamless transition between the past program guide information and the current or future guide information is preserved.

2. The method of claim 1, wherein the past program guide information does not display program information corresponding to non-playable program content.

3. The method of claim 1, wherein channel identifiers are listed vertically.

4. The method of claim 1, wherein time slots are displayed horizontally.

5. The method of claim 1, wherein the on-demand program information is displayed chronologically in rows corresponding to the second plurality of channel identifiers.

6. The method of claim 1, wherein horizontal navigation through the on-demand program information in one row only effects the items in that particular row.

7. The method of claim 1, wherein transition from current or future program guide information to the past program guide information occurs seamlessly without a user having to open another application.

8. A system for implementing a program guide, the system comprising:
a processor, and
memory storing one or more programs configured for execution by the processor, the one or more programs comprising instructions for:
sending a first request from a client device to a server, the first request associated with current or future program guide information;
receiving a first response at the client device from the server, the first response associated with the current or future program guide information, the current or future program guide information including a first plurality of channel identifiers and a plurality of time slots, the plurality of time slots corresponding to current or future time slots;

displaying at the client device in a viewport, the current or future program guide information including the first plurality of channel identifiers and the plurality of time slots, wherein blocks corresponding to current or future programs are sized according to the length of the program;

sending a second request from the client device to the server, the second request associated with past program guide information, wherein the second request indicates a requested time period that has already occurred and not displayed on the client device, the second request corresponding to navigation to a previous time slot;

receiving a second response at the client device from the server, the second response associated with the past program guide information, wherein the past program guide information includes a second plurality of channel identifiers; and displaying at the client device in the viewport, the past program guide information including the second plurality of channel identifiers, past program information, and on-demand program information, wherein the second plurality of channel identifiers are listed vertically and blocks corresponding to past programs are not sized according to the length of the past programs and the blocks corresponding to the past programs are listed chronologically such that a single display format that provides a seamless transition between the past program guide information and the current or future guide information is preserved.

9. The system of claim 8, wherein the past program guide information does not display program information corresponding to non-playable program content.

10. The system of claim 8, wherein channel identifiers are listed vertically.

11. The system of claim 8, wherein time slots are displayed horizontally.

12. The system of claim 8, wherein the on-demand program information is displayed chronologically in rows corresponding to the second plurality of channel identifiers.

13. The system of claim 8, wherein horizontal navigation through the on-demand program information in one row only effects the items in that particular row.

14. The system of claim 8, wherein transition from current or future program guide information to the past program guide information occurs seamlessly without a user having to open another application.

15. A non-transitory computer readable medium storing one or more programs configured for execution by a computer, the one or more programs comprising instructions for:

sending a first request from a client device to a server, the first request associated with current or future program guide information;

receiving a first response at the client device from the server, the first response associated with the current or future program guide information, the current or future program guide information including a first plurality of channel identifiers and a plurality of time slots, the plurality of time slots corresponding to current or future time slots;

displaying at the client device in a viewport, the current or future program guide information including the first plurality of channel identifiers and the plurality of time slots, wherein blocks corresponding to current or future programs are sized according to the length of the program;

sending a second request from the client device to the server, the second request associated with past program guide information, wherein the second request indicates a requested time period that has already occurred and not displayed on the client device, the second request corresponding to navigation to a previous time slot;

receiving a second response at the client device from the server, the second response associated with the past program guide information, wherein the past program guide information includes a second plurality of channel identifiers; and displaying at the client device in the viewport, the past program guide information including the second plurality of channel identifiers, past program information, and on-demand program information, wherein the second plurality of channel identifiers are listed vertically and blocks corresponding to past programs are not sized according to the length of the past programs and the blocks corresponding to the past programs are listed chronologically such that a single display format that provides a seamless transition between the past program guide information and the current or future guide information is preserved.

16. The non-transitory computer readable medium of claim 15, wherein the past program guide information does not display program information corresponding to non-playable program content.

17. The non-transitory computer readable medium of claim 15, wherein channel identifiers are listed vertically.

18. The non-transitory computer readable medium of claim 15, wherein time slots are displayed horizontally.

19. The non-transitory computer readable medium of claim 15, wherein the on-demand program information is displayed chronologically in rows corresponding to the second plurality of channel identifiers.

20. The non-transitory computer readable medium of claim 15, wherein horizontal navigation through the on-demand program information in one row only affects the items in that particular row.

* * * * *